United States Patent [19]

Bosshart et al.

[11] Patent Number: 5,508,950
[45] Date of Patent: Apr. 16, 1996

[54] CIRCUIT AND METHOD FOR DETECTING IF A SUM OF TWO MULTIBIT NUMBERS EQUALS A THIRD MULTIBIT CONSTANT NUMBER PRIOR TO AVAILABILITY OF THE SUM

[75] Inventors: Patrick W. Bosshart, Plano; Sanjive Agarwala, Dallas, both of Tex.

[73] Assignee: Texas Instruments Incorporated, Dallas, Tex.

[21] Appl. No.: 166,370

[22] Filed: Dec. 13, 1993

Related U.S. Application Data

[62] Division of Ser. No. 922,926, Jul. 31, 1992, Pat. No. 5,270,955.
[51] Int. Cl.$^6$ .................................................. G06F 7/00
[52] U.S. Cl. .................................. 364/736.5; 364/787
[58] Field of Search .......................... 364/736.5, 787, 364/768, 715.01

[56] References Cited

U.S. PATENT DOCUMENTS

| | | | |
|---|---|---|---|
| 3,983,382 | 9/1976 | Weinberger | 235/173 |
| 4,764,887 | 8/1988 | Lai et al. | 364/787 |
| 4,815,019 | 3/1989 | Bosshart | 364/736.5 |
| 4,831,570 | 5/1989 | Abiko | 364/715.01 |
| 4,924,422 | 5/1990 | Vassiliadis et al. | 364/736.5 |
| 5,020,016 | 5/1991 | Nakano et al. | 364/736.5 |
| 5,095,458 | 3/1992 | Lynch et al. | 364/787 |

FOREIGN PATENT DOCUMENTS 0328871 8/1989 European Pat. Off. .
0362580 4/1990 European Pat. Off. .

OTHER PUBLICATIONS

IBM Technical Disclosure Bulletin vol. 30, No. 11, Apr. 88, pp. 288–290.

Primary Examiner—Tan V. Mai
Attorney, Agent, or Firm—Robert D. Marshall, Jr.; James C. Kesterson; Richard L. Donaldson

[57] ABSTRACT

A circuit and method for detecting if a sum of a first multibit number A of N bits and a second multibit B of N bits equals a third multibit number C of N bits prior to availability of the sum of A and B. A propagate signal, a generate signal and a kill signal are generated for each bit in the proposed sum. A zero signal is formed from these signals. The particular manner of formation of the zero signal for each bit depends upon the state of the third multibit number C for the corresponding bit and the prior bit. The zero signal is an exclusive OR of the corresponding propagate signal $P_n$ and a kill signal $K_{n1}$ of a prior bit if the current bit and the prior bit of C are "00". The zero signal is an exclusive NOR of the corresponding propagate signal $P_n$ and a generate signal $G_{n-1}$ of a prior bit if the current bit and the prior bit of C are "01". The zero signal is an exclusive NOR of the corresponding propagate signal $P_n$ and a kill signal $K_{n-1}$ of a prior bit the current bit and the prior bit of C are "10". The zero signal is an exclusive OR of the corresponding propagate signal $P_n$ and a generate signal $G_{n-1}$ of a prior bit if the current bit and the prior bit of C are "11". The sum of A and B equals C if all the zero signals are active "1". The propagate signal, generate signal and kill signal of the various bits can be used to from the sum. This technique provides the equality signal before the carry of the sum can ripple through the addition.

5 Claims, 7 Drawing Sheets

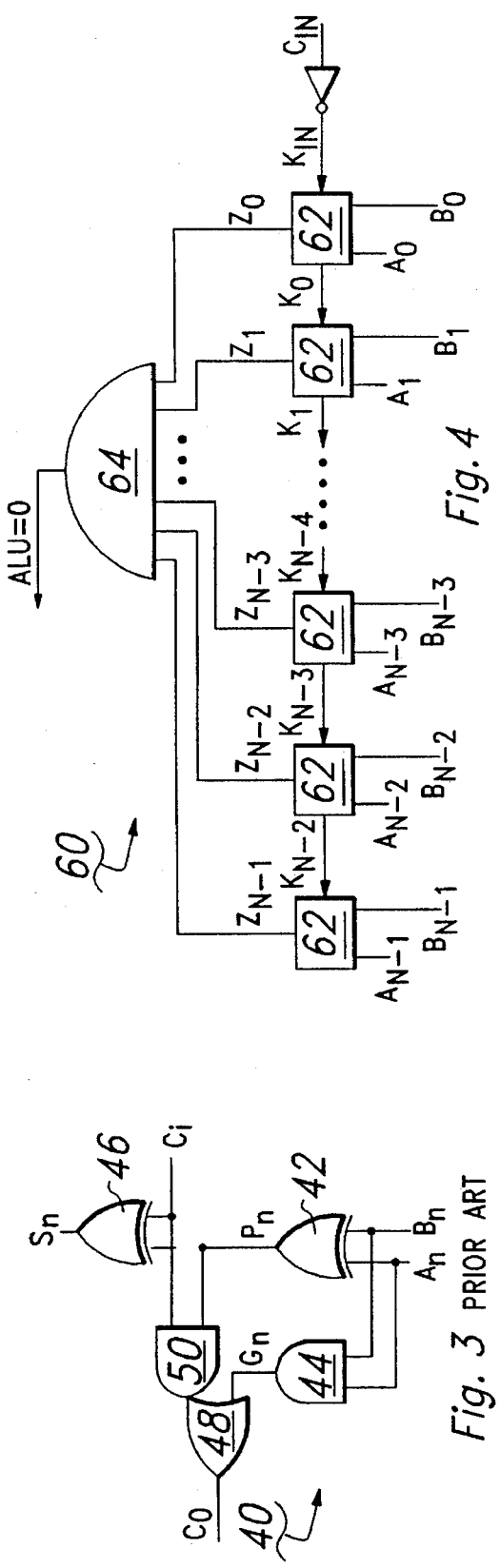
Fig. 4
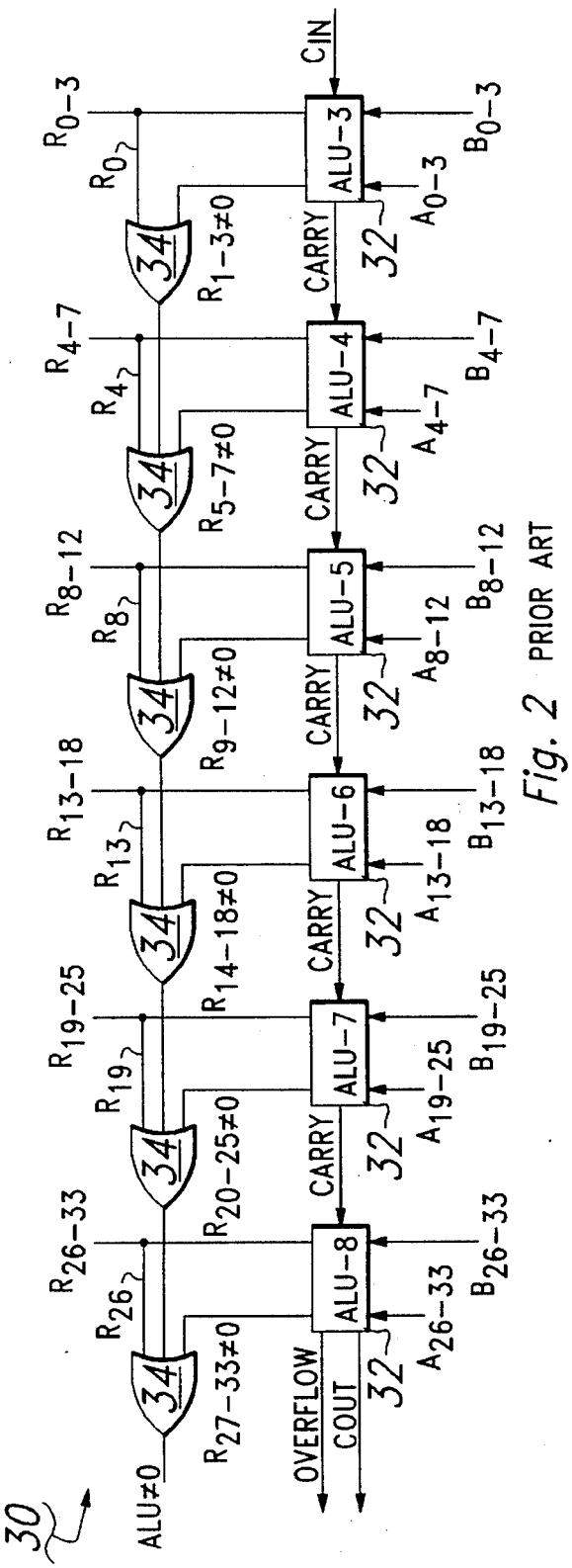
Fig. 3 PRIOR ART
Fig. 2 PRIOR ART

CIRCUIT AND METHOD FOR DETECTING IF A SUM OF TWO MULTIBIT NUMBERS EQUALS A THIRD MULTIBIT CONSTANT NUMBER PRIOR TO AVAILABILITY OF THE SUM

This is a division of application Ser. No. 07/922,926, filed Jul. 31, 1992, U.S. Pat. No. 5,270,955.

CROSS-REFERENCE TO RELATED PATENTS AND APPLICATIONS

| Pat. No. /Appl. No. | Filing Date | TI Case No. |
| --- | --- | --- |
| 4,815,019 | Feb. 26, 1987 | TI-12438 |
| 07/923,282 | Sept. 29, 1992 | TI-16575 |
| 07/953,637 | July 31, 1992 | TI-16055 |

FIELD OF THE INVENTION

This invention generally relates to computer arithmetic logic units in general, and a method of detecting an arithmetic or logical computation result in particular.

BACKGROUND OF THE INVENTION

In the field of computing, program execution branch decisions are frequently made based on the result of a previous computation. A typical computer has an arithmetic logic unit (ALU) which performs mathematical operations on two or more "N" bit operands where "N" represents the total number of bits per operand. It will also be convenient to refer to the "n"th bit where "n" is an index variable whose value is between 0 and N–1, inclusive. A typical computation result upon which branching decisions are made is the ALU=0 condition. Many times a branch will be made if the result of a computation is zero, otherwise program execution will continue at the next command, or vice versa. Heretofore in this field, tests for arithmetic computation results relied upon the actual computation results.

SUMMARY OF THE INVENTION

This invention recognizes that the timing of the zero condition (ALU=0) signal is often more critical than the computation result itself. In the preferred embodiment of the present invention, the arithmetic or logical condition signal will be computed before the actual computation result becomes available.

The preferred embodiment of the present invention produces a signal for each bit, herein known as a one-bit-zero signal, of an ALU such that the arithmetic or logical condition signal may be computed independently from the computation result. The nth one-bit-zero signal, where n is between 0 and N–1, inclusive, is preferably dependent only upon nth and n minus first (n–1)th bit of each operand. The least significant (zeroeth) one-bit-zero detector is dependent only on the zeroeth bit of each operand and a carry-in signal, $C_{in}$, since an (n–1)th bit is not available for the least significant one-bit-zero detector.

In a preferred embodiment of the present invention, all of the one-bit-zero signals are then logically and'ed to produce a global ALU=0 signal independent of the computation result. The inventive concepts described herein may be incorporated within adder designs, subtracter designs, or ALU designs. Within any of these designs, or others, the inventive concepts described herein may be utilized to detect arithmetic conditions including a computation result of "0" or a zero result in all bits, a computation result of "1" or a one result in all bits, or a subfield="0" or "1". Extending this logic, any selected logic result can be compared to a known value to expediently determine whether said logic result is identical to said known value.

In a preferred embodiment of the invention a zero detection circuit is described. The circuit comprises a set of one-bit-zero cells which receive a first operand, A, a second operand, B, and a $C_{in}$, and generates a set of one-bit-zero signals, Z. A combinatorial circuit receives the set of one-bit-zero signals and provides a selected output which is a known function of the one-bit-zero signals. In a preferred embodiment, the combinatorial circuit is a logical AND function which detects a condition when all the one-bit-zero signals are positively asserted. In various embodiments of the preferred invention the one-bit-zero signals may be operable to detect a zero condition for operations of addition, subtraction, or a logic operation. Other devices, systems and methods are also disclosed.

BRIEF DESCRIPTION OF THE DRAWINGS

In the drawings:

FIG. 2 is a schematic diagram of another prior art ALU=0 circuit;

FIG. 3 is a partial schematic diagram of the Propagate and Generate circuitry of the prior art ALU's of FIGS. 1–2;

FIG. 4 is a schematic diagram of a preferred embodiment ALU=0 circuit;

Corresponding numerals and symbols in the different figures refer to corresponding parts unless otherwise indicated.

DETAILED DESCRIPTION OF PREFERRED EMBODIMENTS

Figure 1:
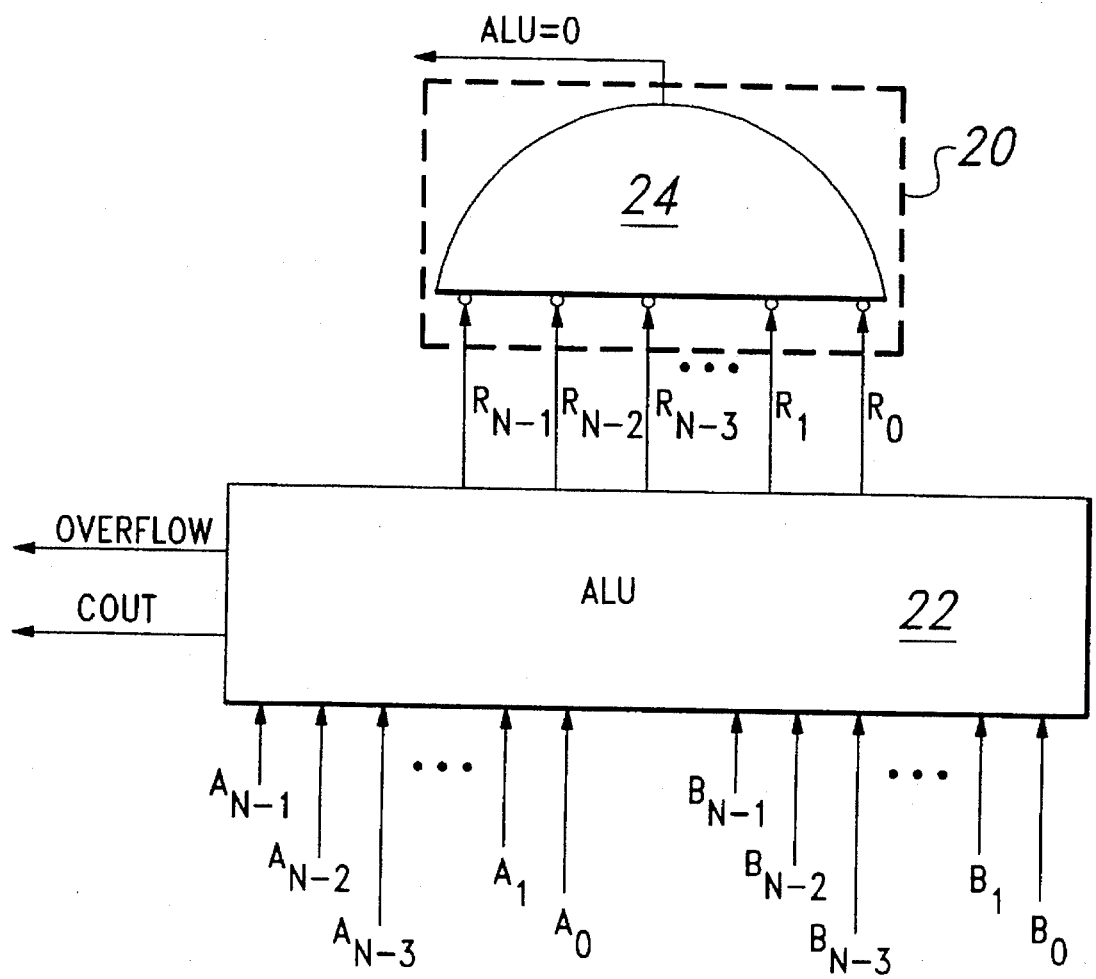
FIG. 1 is a schematic diagram of a prior art ALU=0 circuit.

Referring now to FIG. 1, a prior art ALU=0 circuit 20 is schematically depicted. This ALU=0 circuit 20 receives the result outputs, $R_0$ through $R_{N-1}$, of the ALU 22. The ALU 22 performs a specified arithmetic operation on its operands, $A_0$ through $A_{N-1}$ and $B_0$ through $B_{N-1}$. These operations may be arithmetic operations such as addition or subtraction or specified logical operations such as a logical AND or logical OR. The ALU=0 circuit 20 consists of a combinatorial logic circuit which has been depicted here as an N bit logical NOR gate 24. By definition of the NOR function, the ALU=0 output of this NOR gate 24 will be positively asserted if and only if all inputs to the NOR gate 24 is zero (hence, the computation result is zero). Typically this N bit AND gate 24 would be implemented with a network of smaller gates which would perform the same function. The difficulty with this architecture is the arithmetic or logical computation must be completed and the outputs of the ALU 22 must be available before a determination of the ALU=0 condition can be made.

FIG. 2 schematically depicts another prior art ALU=0 circuit 30 disclosed by Bosshart in U.S. Pat. No. 4,815,019. This ALU=0 circuit 30 actually computes ALU≠0 and operates advantageously with a carry-select lookahead ALU by deriving preliminary ALU≠0 signals for each section 32 of the ALU prior to a carry-in signal being received by that section. The preliminary ALU≠0 outputs are the outputs of OR gates 34. The OR gates 34 receive the least significant bit of their associated ALU section 32, the R≠0 signal from their associated ALU section 32, and the ALU≠0 from an earlier section OR gate 34, if applicable. Thus, the ALU≠0 ripples across the ALU through OR gates 34 as the carry signal ripples across the ALU sections 32. When the carry-in signal is received, a final comparison is made with the least significant bit of the section and the final ALU≠0 signal is generated. The R≠0 computation for any ALU section 32 is completed one gate delay after the ALU result for that section is completed. The final ALU≠0 computation is completed one gate delay after the carry-select lookahead ALU computation is complete. It is obvious to one of ordinary skill in the art that the ALU≠0 signal may be inverted to obtain an ALU=0 signal, if necessary.

FIG. 3 is a schematic diagram of a one-bit adder cell for prior art adders. N of these cells would be integrated with the carry-out, $C_n$, of each cell feeding the carry-in of its next most significant neighbor. $C_n$ of the most significant (N–1st) cell would be a $C_{out}$ signal for use by other adders operating on yet more significant bits of an operand of greater than N bits. $C_{n-1}$ of the least significant (zeroeth) cell would be a $C_{in}$ signal supplied from the $C_{out}$ signal from additional adders operating on yet less significant bits of an operand of greater than N bits. The circuit 40 serves to compute a one bit sum $S_n$ based on the one bit operands $A_n$ and $B_n$, and on a carry-in signal $C_{n-1}$ from a less significant one-bit cell. In the case of the least significant one-bit cell, $C_{n-1}$ will be $C_{in}$. This one-bit cell also generates two internal signals commonly referred to as the "Generate" signal, $G_n$, and the "Propagate" signal, $P_n$. The propagate cell 42 is a logical XOR gate whose function is described by the equation $P_n=A_n\oplus B_n$, where $\oplus$ is the symbol for the logical XOR function. By definition of the XOR function, $P_n=0$ if $A_n,B_n=0,0$ or $1,1$ and $P_n=1$ if $A_n,B_n=0,1$ or $1,0$. The generate cell 44 is a logical AND gate whose function is described by the equation $G_n=A_n\cdot B_n$, where · is the symbol for the logical AND function. By definition of the AND function, $G_n=0$ if $A_n,B_n=0,0$ or $0,1$ or $1,0$ and $G_n=1$ if $A_n,B_n=1,1$. The one-bit sum $S_n$ is output from another XOR gate 46 whose output is $P_n\oplus C_{n-1}$. The carry output $C_n$ is defined as the output of an OR gate 48 whose inputs are $G_n$ and the output of an AND gate 50. The AND gate 50 receives $P_n$ and $C_{n-1}$. The output $C_n$ is defined in terms of $C_{n-1}$, $P_n$, and $G_n$ as $C_n=G_n+P_n\cdot C_{n-1}$, where "+" is the symbol for a logical OR. In other words, a carry is generated if a generate signal ($G_n$) occurs OR if a propagate signal ($P_n$) occurs AND a carry-in ($C_{n-1}$) is present.

FIG. 4 schematically illustrates a preferred embodiment ALU=0 circuit 60. FIG. 4 shows an N bit ALU=0 circuit 60 which receives inputs $A_0$ through $A_{N-1}$, $B_0$ through $B_{N-1}$, where n is between 0 and N–1, inclusive. Each of N one-bit-zero cells 62 receives inputs $A_n$, $B_n$ and $K_{n-1}$, where n is from 0 to N-1, inclusive. $K_n$ is a "kill" signal which will be described below. Each nth one-bit-zero cell outputs a one-bit-zero signal $Z_n$ and a "kill" signal $K_n$ to be received by the next most significant (n+1) cell. A combinatorial circuit represented in FIG. 4 by an N bit AND gate 64 serves to output a single ALU=0 signal if all $Z_n$ for n=0 to N–1 are positively asserted. This N-bit AND gate 64 would typically be effected by a network of gates of less than N bits in a manner obvious to one of ordinary skill in the art of digital logic circuit design. The advantage of this architecture is the generation of an ALU=0 signal which is available within several stages of combinatorial logic gate delays. The amount of logic gate delays is on the order of $\log_2 N$ multiplied by a gate delay, whereas the amount of delay incurred in a prior art ALU=0 detector circuit is the computation delay, which varies from roughly $1+\log_2 N$ to $2N$ multiplied by a gate delay, in addition to a combinatorial logic gate delays ($\log_2 N$) which still must be used to decode the computation result for ALU=0. The preferred embodiment ALU=0 circuitry of FIG. 4 could be utilized within an ALU, using the ALU's existing Propagate and Generate circuitry, if available, in conjunction with new one-bit-zero, Kill, and combinatorial ALU=0 circuitry to generate the ALU=0 signals. Alternatively, the preferred embodiment circuitry could be implemented in a separate unit, using its own PGKZ (Propagate, Generate, Kill, and Zero) circuitry to receive $A_0$ through $A_{N-1}$, $B_0$ through $B_{N-1}$, and $C_{in}$ thereby forming a standalone ALU=0 circuit.

Figure 5:
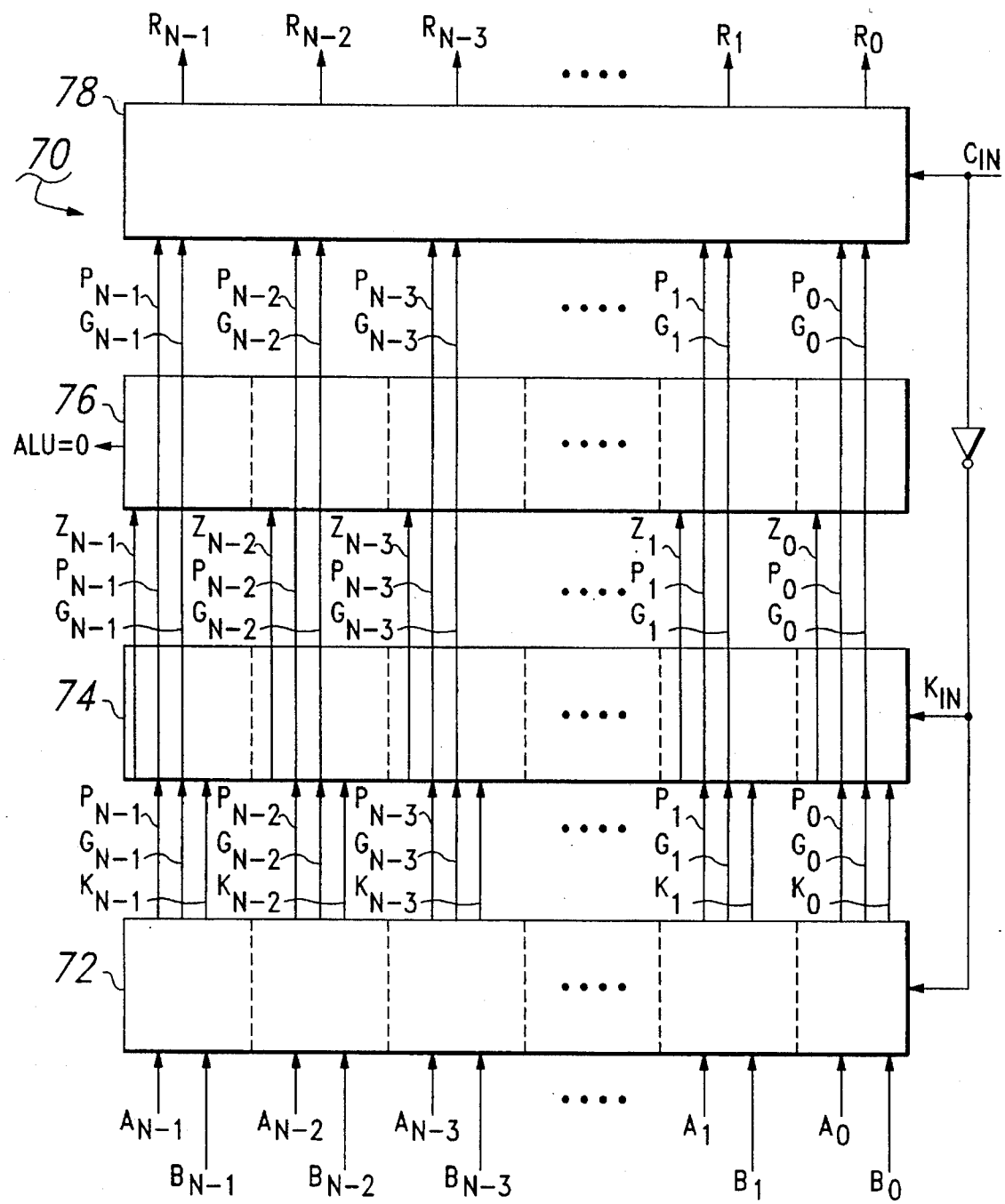
FIG. 5 is high level schematic diagram of an adder which incorporates a preferred embodiment ALU=0 circuit.

FIG. 5 depicts, in a high level schematic diagram, a preferred embodiment circuit 70 which incorporates a preferred embodiment ALU=0 circuit. This circuit 70 receives inputs $A_n$ and $B_n$ for n=0 to N–1, receives a carry-in signal, $C_{in}$, and outputs resultant $R_n$ for n=0 to N–1 and ALU=0. The inputs $A_n$ and $B_n$ are received by a PGK section 72 which generates a Propagate signal $P_n$, a Generate signal $G_n$, and a Kill signal $K_n$ for n=0 to N–1, inclusive. The $P_n$, $G_n$, and $K_n$ signal definitions are defined as follows:

$K_n=\overline{A_n}\cdot\overline{B_n}$ $G_n=A_n\cdot B_n$ $P_n=A_n\oplus B_n$

Implementations of the circuit schematically and functionally described are numerous and well known of one having ordinary skill in the art of digital circuit design. The one-bit-zero cell array 74 receives the PGK signals and generates a Zero signal $Z_n$ based on $P_n$ and $K_{n-1}$. For the least significant bit of the one-bit-zero array 74 $K_{in}$ (described below) serves as $K_{n-1}$. The $Z_n$ signal is described by the equation: $Z_n=P_n\oplus K_{n-1}$. By definition of the XOR ($\oplus$) function, $Z_n=0$ if $P_n,Z_{n-1}=0,0$ or $1,1$ and $Z_n=1$ if $P_n,Z_{n-1}=0,1$ or $1,0$. The one-bit-zero cell array 74 passes on the PGZ (Propagate, Generate, and Zero) signals. The one-bit-zero AND tree 76 receives the Zero signals and outputs a positively asserted ALU=0 signal if all $Z_n=1$ (positively asserted) for n=0 to N–1, inclusive. The combinatorial logic circuit 76, preferably an AND tree, merely passes the PG signals through, unaffected. The PG signals are shown passing through the one-bit-zero AND tree 76 merely for drawing convenience. No need exists for the routing of these signals to pass through or near the AND tree 76. Still referring to FIG. 5, the adder circuit 78 receives the PG signals, and generates an operation result $R_n$ for n=0 to N−1, inclusive, in a manner well known to one of ordinary skill in the art. For example, this adder 78 may be a carry-select lookahead adder as described by Bosshart in U.S. Pat. No. 4,815,019. Alternatively, it may be a ripple carry adder composed of N partial cells of FIG. 3, in which XOR gate 46 computes $S_n$ from $C_{n-1}$ and $P_n$, and OR gate 48 and AND gate 50 computes $C_n$ from $P_n$ and $G_n$ (n is from 0 to N−1, inclusive). The adder circuit 78 may actually perform as an arithmetic/logic circuit to generate a result for addition, subtraction, or a logical operation depending on the method used to generate $P_n$ and $G_n$ from the PGK generating unit 72. In the preferred embodiment of the present invention, the operation of adder circuit 78 is not dependent on the operation being performed. In the preferred embodiment, all operation-specific functions are performed within the PGK generating unit 72. The preferred embodiment adder shown in FIG. 5 further comprises an inverter 80 for receiving a $C_{in}$ signal from a less significant arithmetic and logic circuit, and inverting that signal for use as $K_{in}$ by the PGK generating unit 72 and the one-bit-zero cell array 74.

Figure 6:
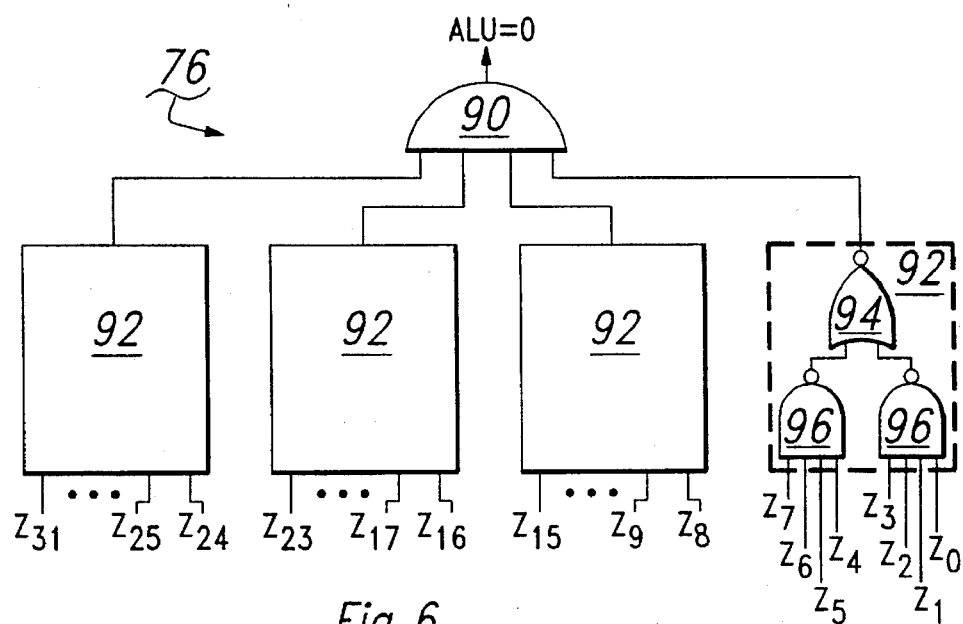
FIG. 6 is a schematic diagram of the AND tree of FIG. 5.

Referring now to FIG. 6, a possible embodiment carry tree 76 as mentioned above is depicted. In this embodiment of carry tree 76, N has been chosen to be 32 bits although N may be chosen to be any number. The carry tree 76 of this embodiment serves to provide a 32 bit AND function providing an ALU=0 signal from the N one-bit-zero signals, $Z_n$. The carry tree 76 comprises a four-input AND gate 90 and four eight-input AND gates 92. As is well known in the art, these eight-input AND gates 92 could be formed from a two-input NOR gate 94 receiving the output of two four-input NAND gates 96. Furthermore, many further functional implementations of a 32 bit AND can be accomplished by one of ordinary skill in the art.

Figure 7:
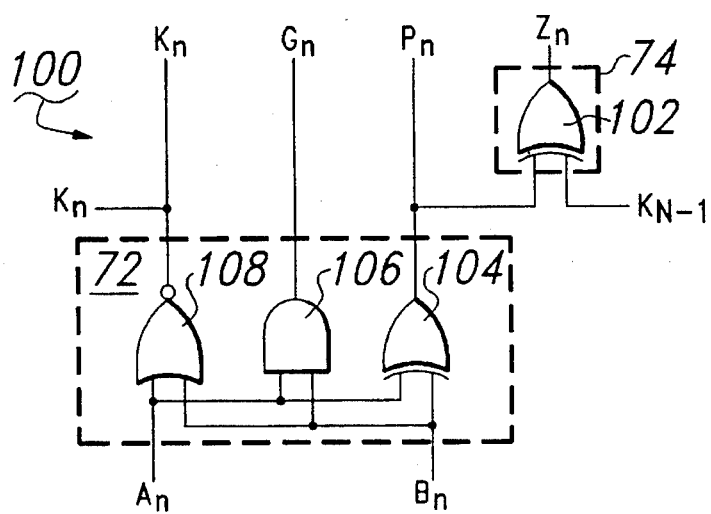
FIG. 7 is a schematic diagram of a one-bit-zero cell which could be incorporated into the ALU of FIG. 5 for addition.
Figure 8:
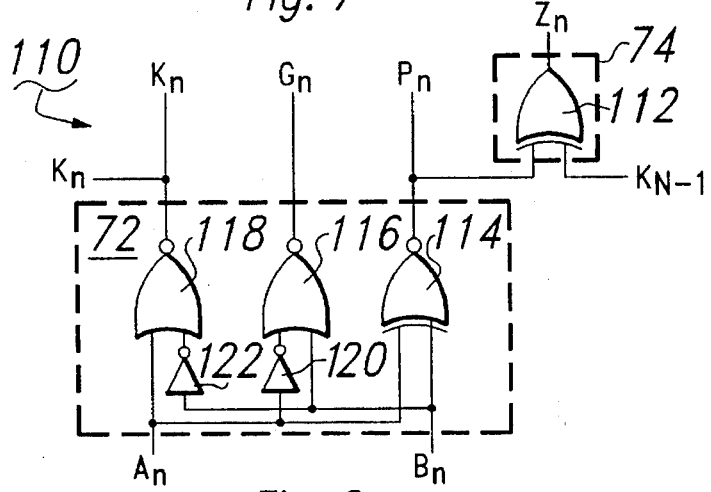
FIG. 8 is a schematic diagram of a one-bit-zero cell which could be incorporated into the ALU of FIG. 5 for subtraction.
Figure 9:
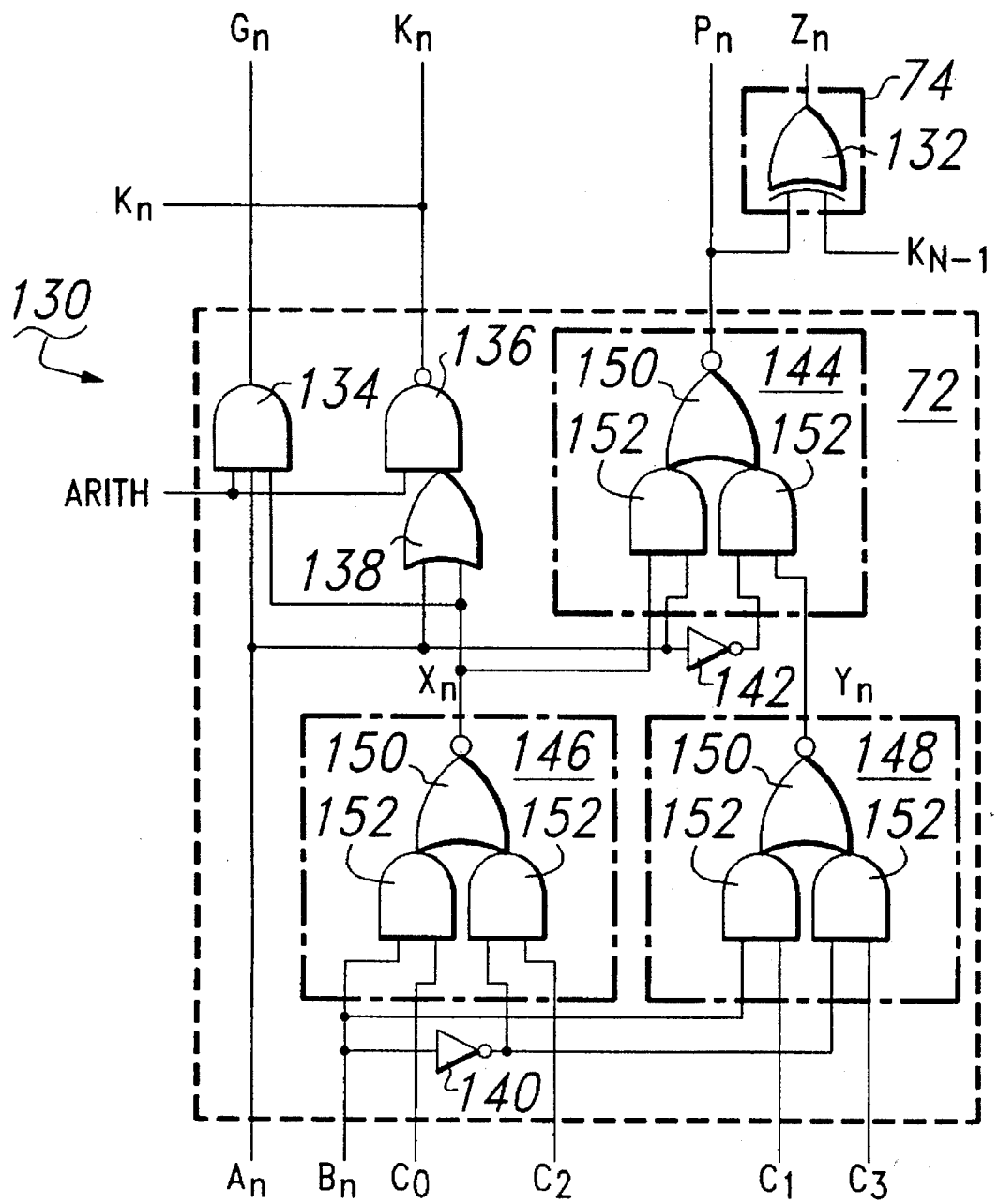
FIG. 9 is a schematic diagram of a one-bit-zero cell which could be incorporated into the ALU of FIG. 5 for performing general arithmetic and logical operations.

Referring now to FIG. 7, a first possible embodiment PGK generating circuit 72 cooperating with a possible embodiment one-bit-zero cell 74 for an adder is partially depicted. The embodiment of FIG. 7 is a one-bit PGKZ cell 100 for the nth bit of PGK generating circuit 72 and the nth bit of one-bit-zero cell array 74. The PGKZ cell 100 comprises a first and second XOR gate 102,104, an AND gate 106, and a NOR gate 108 and inputs $A_n$, $B_n$, and $K_{n-1}$. Outputs of this PGKZ cell 100 are $P_n$, $G_n$, $K_n$, and $Z_n$. For the least significant bit (i.e. n=0), $K_{in}$ is $K_{n-1}$. As schematically depicted in the figure, the function of this cell is described by:

$K_n = \overline{A_n} \cdot \overline{B_n}$ $G_n = A_n \cdot B_n$ $P_n = A_n \oplus B_n$ $Z_n = A_n \oplus B_n \oplus K_{n-1} = P_n \oplus K_{n-1}$ Referring now to FIG. 8, a second possible embodiment PGK generating circuit 72 cooperating with a possible embodiment one-bit-zero cell 76 for a subtracter is partially depicted. The embodiment of FIG. 8 is a one-bit PGKZ cell 110 for the nth bit of PGK generating circuit 72 and the nth bit of one-bit-zero cell array 74. The PGKZ cell 110 comprises an XOR gate 112, an XNOR gate 114, a first and second NOR gate 116,118, and a first and second inverter 120,122. The PGKZ cell 110 inputs $A_n$, $B_n$, and $K_{n-1}$. Outputs of this PGKZ cell 110 are $P_n$, $G_n$, $K_n$, and $Z_n$. For the least significant bit (i.e. n=0), $K_{in}$ is $K_{n-1}$. As schematically depicted in the figure, the function of this cell is described by:

$K_n = \overline{A_n} \cdot B_n$ $G_n = A_n \cdot \overline{B_n}$ $P_n = \text{not } (A_n \oplus B_n)$ $Z_n = \text{not } (A_n \oplus B_n) \oplus K_{n-1} = P_n \oplus K_{n-1}$ Referring now to FIG. 9, a third possible embodiment PGK generating circuit 72 cooperating with a possible embodiment one-bit-zero cell 76 for a general purpose ALU is partially depicted. The embodiment of FIG. 9 is a one-bit PGKZ cell 130 for the nth bit of PGK generating circuit 72 and the nth bit of one-bit-zero cell array 74. The PGKZ cell 130 comprises an XOR gate 132, a three input AND gate 134, a NAND gate 136, an OR gate 138, a first and second inverter 140,142, and a first, second, and third AND-OR-INVERT gate 144,146,148. Each of the AND-OR-INVERT gates is described functionally by a NOR function 150, and a pair of AND functions 152. The PGKZ cell 130 inputs $A_n$, $B_n$, $K_{n-1}$, and special ALU control signals C0, C1, C2, C3, and ARITH. Outputs of this PGKZ cell 130 are $P_n$, $G_n$, $K_n$, and $Z_n$. For the least significant bit (i.e. n=0), $K_{in}$ is $K_{n-1}$. As schematically depicted in the figure, the function of this cell is described by:

$X_n = \text{not } (B_n \cdot C0 + \overline{B_n} \cdot C2)$ $Y_n = \text{not } (B_n \cdot C1 + \overline{B_n} \cdot C3)$ $K_n = \text{not } (\text{ARITH} \cdot (A_n + X_n))$ $G_n = \text{ARITH} \cdot A_n \cdot X_n$ $P_n = \text{not } (X_n \cdot A_n + Y_n \cdot \overline{A_n})$ $Z_n = P_n \oplus K_{n-1}$ Examination of FIG. 9 in conjunction with the above equations for $P_n$, $G_n$, $K_n$, and $Z_n$ reveals that the signal ARITH serves to select between arithmetic and logical operations. Examination of $K_n$ reveals that if ARITH is negatively asserted, then $K_n$ will be positively asserted regardless of other signal inputs. As the "kill" signal, K, is functionally opposite a "carry" function, K being positively asserted means that carries will not occur during logical operations. This functionality is consistent with well understood principles of logic circuit design.

Figure 10:
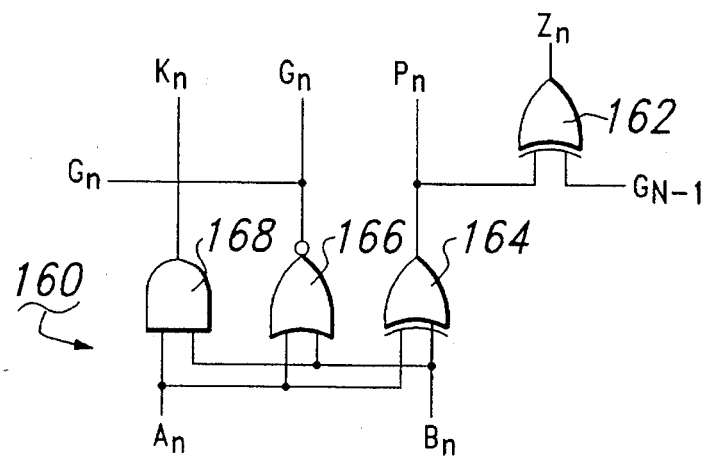
FIG. 10 is a schematic diagram of a one-bit cell for detecting a "one" condition.
Figure 11:
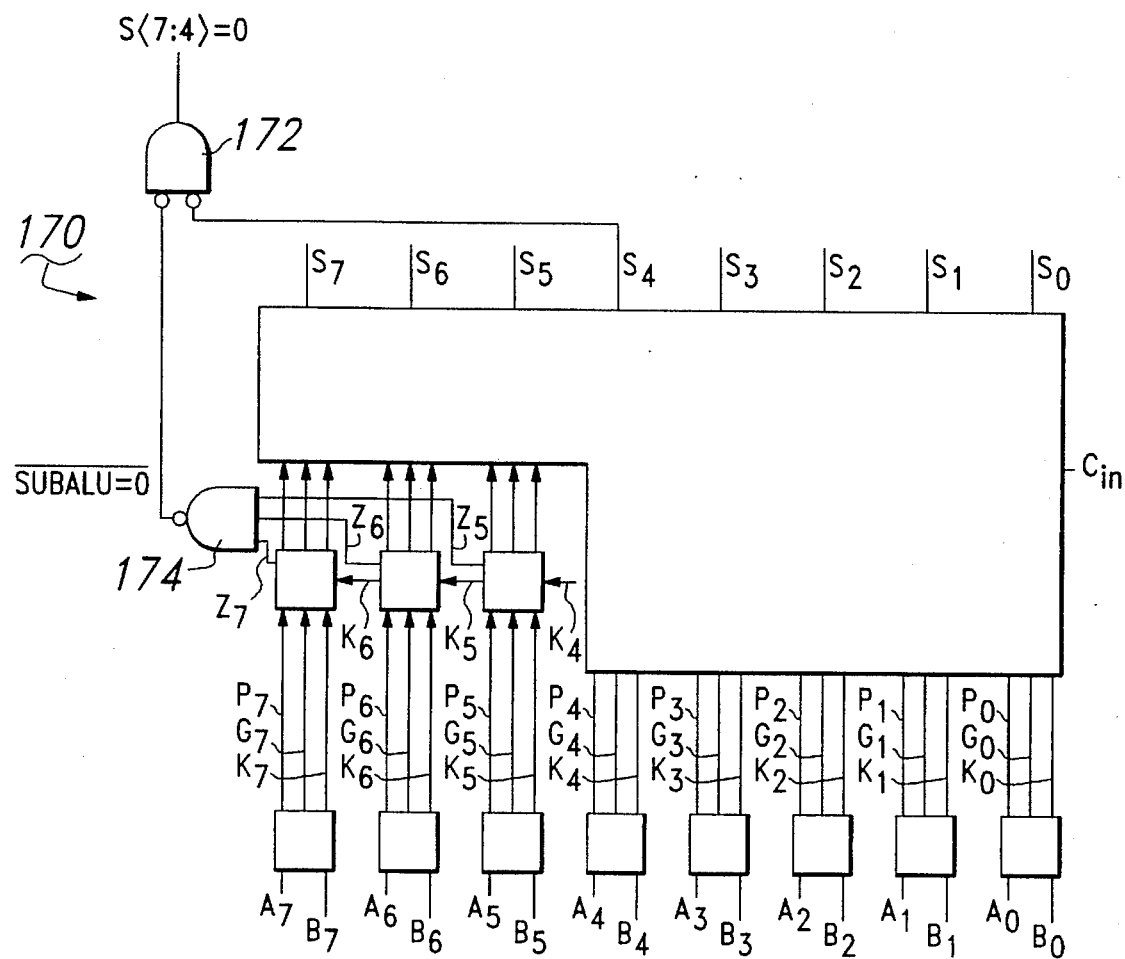
FIG. 11 is a schematic diagram of a SUBFIELD=0 cell.

Referring now to FIG. 10, an alternate embodiment PGK1 cell 160 of an ALU=1's circuit of an adder comprising N PGK1 cells shown schematically. This alternate embodiment PGK1 uses the Generate signal carried in from the next least significant bit (n−1st), in conjunction with the Propagate signal to assert a one-bit-one signal $Z_n'$. This PGK1 cell 160 comprises a first and second XOR gate 162,164, a NOR gate 166, and an AND gate 168. The PGK1 cell 160 inputs $A_n$, $B_n$, and $G_{n-1}$. Outputs of this PGK1 cell 160 are $P_n$, $G_n$, $K_n$, and $Z_n'$. For the least significant bit (i.e. n=0), $G_{n-1}$ is 0. As schematically depicted in the figure, the function of this cell is described by:

$K_n = \overline{A_n} \cdot \overline{B_n}$ $G_n = A_n \cdot B_n$ $P_n = A_n \oplus B_n$ $Z_n = A_n \oplus B_n \oplus G_{n-1} = P_n = G_{n-1}$ FIG. 11 shows a SUBFIELD=0 circuit 170 which operates as the ALU circuit described above, but inputs the sum of the least significant bit ($S_n$, n=4 in this instance) of the subfield directly into a two input NOR gate 172, and receives a SUBALU=0 which is the output of a NAND gate 174 which NAND's the remaining one-bit-zero signals of the subfield. ($Z_n$ n=5, 6, and 7 in this instance). Generally a SUBFIELD=0 circuit is implemented by NANDing the outputs of the 1-bit zero cells for all but the LSB of the subfield, then NORing that result with the ALU output of the subfield. A SUBFIELD=1's can be implemented in an analogous manner.

For detecting constant values other than all 0's or all 1's, the circuit of the preferred embodiment need only be slightly modified. For example, in the adder ALU=0 embodiment the one-bit-zero signal is identified as $P_n \oplus K_{n-1}$. In other words, assuming the next less significant (n−1) bit is zero, the zero detection in the nth bit is the XOR of bit's (bit n) propagate output with the next less significant (n−1) bit's kill output. Now, the complement of the one-bit zero signal detects a one in bit n assuming bit n−1 is zero. This logic can be described by the equation $P_n \odot K_{n-1}$. Likewise, $P_n \oplus G_{n-1}$, can be used to detect a one at bit n assuming bit n−1 is also one and $P_n \odot G_{n-1}$ detects a zero at bit n assuming bit n−1 is a one.

The logic above may be summarized as follows. For a detector for any desired constant output, there are a total of four patterns to search for when building the equivalent of the one-bit-zero cell to detect the required output at bit n. These reflect the two possible values required at each bit with the two possible values required at bit n−1. The equations for the four conditions are summarized in the table below:

| bit n | bit n−1 | logic equation |
| --- | --- | --- |
| 0 | 0 | $P_n \oplus K_{n-1}$ |
| 0 | 1 | $P_n \odot G_{n-1}$ |
| 1 | 0 | $P_n \odot K_{n-1}$ |
| 1 | 1 | $P_n \oplus G_{n-1}$ |

Figure 12:
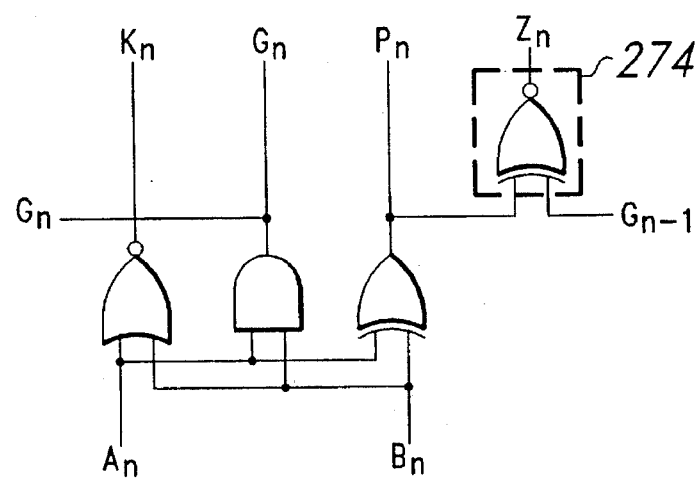
FIG. 12 is a schematic diagram of a one-bit-zero cell for bit n=0 and bit n–1=1.
Figure 13:
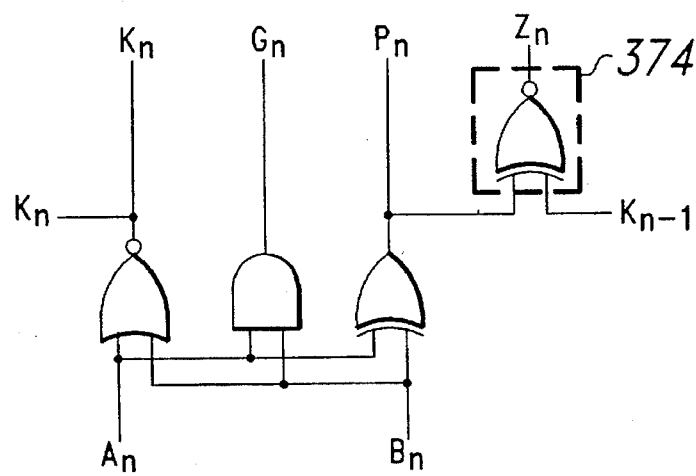
FIG. 13 is a schematic diagram of a one-bit zero cell for bit n=1 and n–1=0.
Figure 14:
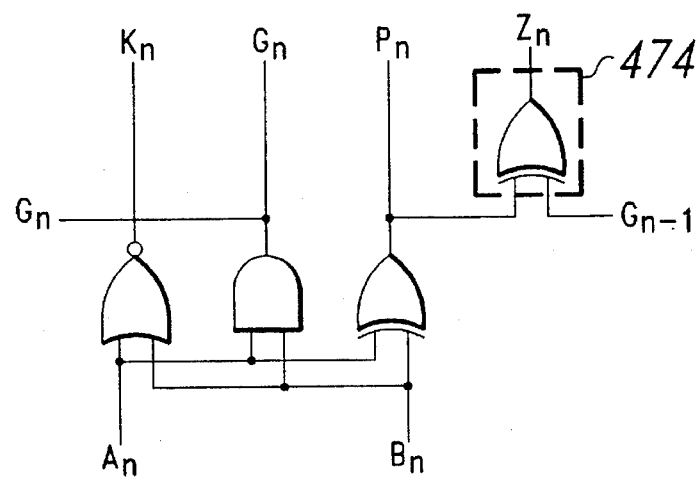
FIG. 14 is a schematic diagram of a one bit zero cell for bit n=1 and bit n–1=1.

The circuitry for the logic equations above are as follows: FIG. 7 shows the logic circuit for the one-bit-zero cell for bit n=0 and bit n−1=0 where $Z_n = P_n \oplus K_{n-1}$; FIG. 12 shows the logic circuit for the one-bit-zero cell for bit n=0 and bit n−1=1 where $Z_n = P_n \odot G_{n-1}$; FIG. 13 shows the logic circuit for the one-bit-zero cell for bit n−1 and bit n−1=0 where $Z_n = P_n \odot K_{n-1}$; and, FIG. 14 shows the logic circuit for the one-bit-zero cell for bit n=1 and bit n−1=1 where $Z_n = P_n \oplus G_{n-1}$. The logical circuit of FIG. 12 has the same or an identical PG|K section 72 as that of FIG. 7, but differs in its implementation of the one-bit-zero cell array 274 by using an EXNOR gate with inputs $P_n$ and $G_{n-1}$ to correspond with its logic equation. The logical circuit of FIG. 13 has the same or an identical PG|K section 72 as that of FIG. 7, but differs in its implementation of the one-bit-zero cell array 374 by using an EXNOR gate to correspond with its logic equation. The logical circuit of FIG. 12 has the same or an identical PG|K section 72 as that of FIG. 7, but differs in its implementation of the one-bit-zero cell array 474 by using an EXOR gate with inputs $P_n$ and $G_{n-1}$ to correspond with its logic equation.

For detecting a subfield equal to a arbitrary constant, all bits but the lsb of the field require one of the cells above. All their outputs are AND'ed together, then this is AND'ed with the requirement that the LSB of the field have the required value. This circuit is identical to the SUBFIELD=0 detector circuit of FIG. 7, with the exception that the one-bit-zero cells are replaced with the cells from the table above, and that the LSB may be required to be one rather than zero.

The table, below, describes the drawing elements used in the specification hereinabove.

TABLE

| Drawing Element | Generic Term | Preferred or Specific Term | Alternate Terms |
| --- | --- | --- | --- |
| 20 | Prior Art ALU=0 $C_{in}$ | | |
| 22 | Arithmetic Logic Unit | ALU | |
| 24 | Combinatorial Logic Circuit | N bit logical NOR gate | NOR gate |
| 30 | Prior Art ALU=0 Circuit | Carry-select Lookahead ALU-=0 Circuit | |
| 32 | Arithmetic Logic Unit Section | ALU Section | |
| 34 | OR gate | | |
| 40 | Prior Art One-bit Adder Cell | | |
| 42 | Propagate Cell | XOR gate | |
| 44 | Generate Cell | AND gate | |
| 46 | Sum Cell | XOR gate | |
| 48 | OR gate | OR gate | |
| 50 | AND gate | | |
| 60 | Preferred Embodiment ALU=0 Circuit | N bit ALU=0 Circuit | |
| 62 | One-bit zero Cell | | |
| 64 | Combinatorial Circuit | N bit AND Gate | |
| 70 | Preferred Embodiment Adder | | |
| 72 | PGK Section | PGK Circuitry | |
| 74 | One-bit-zero Cell Array | | |
| 76 | One-bit-zero AND Tree | AND Tree | |
| 78 | Adder Unit | Adder | Carry-lookahead Adder, Ripple Carry Adder |
| 80 | Inverter | | |
| 90 | Four-input AND Gate | | |

| bit n | bit n−1 | logic equation |
| --- | --- | --- |
| 1 | 1 | $P_n \oplus G_{n-1}$ |

TABLE-continued

| Drawing Element | Generic Term | Preferred or Specific Term | Alternate Terms |
|---|---|---|---|
| 92 | Eight-input AND Gate | | |
| 94 | Two-input NOR Gate | | |
| 96 | Four-input NAND Gate | | |
| 100 | Adder PGKZ Cell | Adder One-bit PGKZ Cell | |
| 102, 104 | XOR Gate | | |
| 106 | AND Gate | | |
| 108 | NOR Gate | | |
| 110 | Subtractor PGKZ Cell | Subtractor One-bit PGKZ Cell | |
| 112 | XOR Gate | | |
| 114 | XNOR Gate | | |
| 116, 118 | NOR Gate | | |
| 120, 122 | Inverter | | |
| 130 | ALU PGKZ Cell | | |
| 132 | XOR Gate | | |
| 134 | AND Gate | Three-input AND Gate | |
| 136 | NAND Gate | | |
| 138 | OR Gate | | |
| 140, 142 | Inverter | | |
| 144, 146, 148 | AND-OR-INVERT Gate | | |
| 150 | NOR Function | NOR Gate | |
| 152 | AND Function | AND Gate | |
| 160 | PGK1 Cell | Adder ALU=1 PGK Cell | |
| 162, 164 | XOR Gate | | |
| 166 | NOR Gate | | |
| 168 | AND Gate | | |
| 170 | Subfield=0 Circuit | | |
| 172 | NOR Gate | | |
| 174 | NAND Gate | | |
| A | First Operand | N bit First Operand | |
| B | Second Operand | N bit Second Operand | |
| $A_n$ | nth Bit of First Operand | | |
| $B_n$ | nth Bit of Second Operand | | |
| $Z_n$ | nth One-Bit-Zero Signal | nth Zero Signal | |
| $P_n$ | Propagate Signal | nth Propagate Signal | |
| $G_n$ | Generate Signal | nth Generate Signal | |
| $K_n$ | Kill Signal | nth Kill Signal | |
| $K_{n-1}$ | Kill-in Signal | n Minus First Kill Signal | $K_{in}$--Kill-in to LSB |
| $S_n$ | Sum Signal | nth Sum Signal | |
| $C_{n-1}$ | Carry-in Signal | | $C_{in}$--Carry-in to LSB |
| $C_n$ | Carry-out Signal | | $C_{out}$--Carry-out from MSB |
| ALU=0 | Arithmetic Zero Condition Signal | ALU=0 Signal | ALU=0 Output |
| PGZ | PGZ Signal | Propagate, Generate, and Carry Signals | |
| PGKZ | PGKZ Signal | Propagate, Generate, Kill and Zero Signals | |
| PG | PG Signal | Propagate and Generate Signals | |
| PGK | PGK Signal | Propagate, Generate and Kill Signal | |
| C0 | ALU Control Signal | | |
| C1 | ALU Control Signal | | |
| C2 | ALU Control Signal | | |
| C3 | ALU Control Signal | | |
| ARITH | ALU Control Signal | Arithmetic/Logical Select Signal | |
| $Z_n'$ | ALU=1 Signal | nth ALU=1 Signal | |

A few preferred embodiments have been described in detail hereinabove. It is to be understood that the scope of the invention also comprehends embodiments different from those described, yet within the scope of the claims. Words of inclusion are to be interpreted as nonexhaustive in considering the scope of the invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, logic circuits are envisioned in TTL, CMOS, NMOS, ECL, Bi-CMOS, BIPOLAR or any of many other logic families. The circuitry envisioned herein might be incorporated as a part of a larger integrated circuit design, or could stand alone as a single integrated circuit design. It is therefore intended that the appended claims encompass any such modifications or embodiments.

What is claimed is:

1. A circuit for detecting if a sum of a first multibit number A of N bits and a second multibit B of N bits equals a third multibit number C of N bits prior to availability of the sum of A and B, said circuit comprising:

a plurality of N PGK generating circuits, each PGK generating circuit receiving a corresponding nth bit of said first multibit number $A_n$, a corresponding nth bit of said second multibit number $B_n$, each PGK generating circuit including an exclusive OR circuit having a first input receiving said corresponding nth bit of said first multibit number $A_n$ and a second input receiving said corresponding nth bit of said second multibit number $B_n$, said exclusive OR circuit generating a corresponding propagate signal $P_n$ at an output, an AND circuit having a first input receiving said corresponding nth bit of said first multibit number $A_n$ and a second input receiving said corresponding nth bit of said second multibit number $B_n$, said AND circuit generating a corresponding generate signal $G_n$ at an output, a NOR circuit having a first input receiving said corresponding nth bit of said first multibit number $A_n$ and a second input receiving said corresponding nth bit of said second multibit number $B_n$, said NOR circuit generating a corresponding kill signal $K_n$ at an output;

a plurality of N zero circuits, one zero circuit corresponding to one of said PGK generating circuits, each of said zero circuits including an exclusive OR circuit having a first input receiving said corresponding propagate signal $P_n$ and a second input receiving said kill signal $K_{n-1}$ of a prior PGK generating circuit if a corresponding nth bit of said third multibit number $C_n$ is "0" and a corresponding prior bit of said third multibit number $C_{n-1}$ is "0", said zero circuit generating a corresponding zero signal $Z_n$ at an output, an exclusive NOR circuit having a first input receiving said corresponding propagate signal $P_n$ and a second input receiving said generate signal $G_{n-1}$ of a prior PGK generating circuit if a corresponding nth bit of said third multibit number $C_n$ is "0" and a corresponding prior bit of said third multibit number $C_{n-1}$ is "1", said zero circuit generating a corresponding zero signal $Z_n$ at an output, an exclusive NOR circuit having a first input receiving said corresponding propagate signal $P_n$ and a second input receiving said kill signal $K_{n-1}$ of a prior PGK generating circuit if a corresponding nth bit of said third multibit number $C_n$ is "1" and a corresponding prior bit of said third multibit number $C_{n-1}$ is "0", said zero circuit generating a corresponding zero signal $Z_n$ at an output, an exclusive OR circuit having a first input receiving said corresponding propagate signal $P_n$ and a second input receiving said generate signal $G_{n-1}$ of a prior PGK generating circuit if a corresponding nth bit of said third multibit number $C_n$ is "1" and a corresponding prior bit of said third multibit number $C_{n-1}$ is "1", said zero circuit generating a corresponding zero signal $Z_n$ at an output; and an N input AND circuit receiving said corresponding zero signals $Z_n$ from each of said PGK generating circuits for generating an equality signal indicating the sum of said first multibit number A and said second multibit number B equals said third multibit number C if all of said zero signals $Z_n$ are "1".

2. The circuit of claim 1, wherein:

N equals 32; and said N input AND circuit includes a first four input AND gate having a output forming the output of said N input AND circuit and four inputs, 4 eight input AND gates, each having an output connected to a corresponding input of said first 4 input AND gate, each including a two input NOR gate having an output forming the output of said eight input AND gate and two inputs, and 2 four input NAND gates having an output connected to a corresponding input of said two input NOR gate and four inputs receiving corresponding zero signals.

3. The circuit of claim 1, further comprising:

an adder circuit connected to receive said propagate signal $P_n$, said generate signal $G_n$ and said kill signal $K_n$ from each of said PGK generating circuits for generating corresponding bit resultants of a sum of said first multibit number A and said second multibit number B.

4. A method for detecting if the sum of a first multibit number A of N bits and a second multibit B of N bits equals a third multibit number C of N bits prior to availability of the sum of A and B, said method comprising the steps of:

forming a propagate signal $P_n$ for each of said N bits from a corresponding nth bit of said first multibit number $A_n$ and a corresponding nth bit of said second multibit number $B_n$ by forming an exclusive OR;

forming a generate signal $G_n$ for each of said N bits from said corresponding nth bit of said first multibit number $A_n$ and said corresponding nth bit of said second multibit number $B_n$ by forming an AND;

forming a kill signal $K_n$ for each of said N bits from said corresponding nth bit of said first multibit number $A_n$ and said corresponding nth bit of said second multibit number $B_n$ by forming a NOR;

forming a zero signal $Z_n$ for each of said N bits, said zero signal $Z_n$ formed by an exclusive OR of said corresponding propagate signal $P_n$ and said kill signal $K_{n-1}$ of a prior bit if a corresponding nth bit of said third multibit number $C_n$ is "0" and a corresponding prior bit of said third multibit number $C_{n-1}$ is "0".

by an exclusive NOR of said corresponding propagate signal $P_n$ and said generate signal $G_{n-1}$ of a prior bit if a corresponding nth bit of said third multibit number $C_n$ is "0" and a corresponding prior bit of said third multibit number $C_{n-1}$ is "1", by an exclusive NOR of said corresponding propagate signal $P_n$ and kill signal $K_{n-1}$ of a prior bit if a corresponding nth bit of said third multibit number $C_n$ is "1" and a corresponding prior bit of said third multibit number $C_{n-1}$ is "0", by an exclusive OR of said corresponding propagate signal $P_n$ and a second input receiving said generate signal $G_{n-1}$ of a prior bit if a corresponding nth bit of said third multibit number $C_n$ is "1" and a corresponding prior bit of said third multibit number $C_{n-1}$ is "1"; and indicating equality of the sum of said first multibit number A and said second multibit number B and said third multibit number C if all of said zero signals $Z_n$ are "1".

5. The method of claim 4, further comprising:

forming the sum of said first multibit number A and said second multibit number B from said propagate signal $P_n$, said generate signal $G_n$ and said kill signal $K_n$ from each bit.

\* \* \* \* \*